United States Patent
Catanzaro et al.

(10) Patent No.: US 6,438,111 B1
(45) Date of Patent: Aug. 20, 2002

(54) DYNAMICALLY SCALEABLE CONFERENCE SYSTEM

(75) Inventors: Anthony James Catanzaro, Jackson; Steven Jeffrey Corn, Freehold; Igor Khalatian, Morganville; Vinod K. Sajja, Somerset, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/083,408

(22) Filed: May 22, 1998

(51) Int. Cl.[7] .............................................. H04L 12/16
(52) U.S. Cl. ....................................................... 370/260
(58) Field of Search ................................ 370/396, 200, 370/261, 270, 395, 486, 352, 356, 408, 401–403, 400, 410, 256–260; 348/16, 15; 379/221, 202, 204, 202.1; 707/358; 709/223, 231, 227–229, 237, 204

(56) References Cited

U.S. PATENT DOCUMENTS

| | | | | |
|---|---|---|---|---|
| 5,581,552 A | * | 12/1996 | Civanlar et al. ............ | 370/396 |
| 5,625,407 A | * | 4/1997 | Biggs et al. ................ | 370/200 |
| 5,835,129 A | * | 11/1998 | Kumar ........................ | 348/15 |
| 5,854,898 A | * | 12/1998 | Riddle ........................ | 709/231 |
| 5,930,238 A | * | 7/1999 | Nquyen ...................... | 370/260 |
| 6,181,786 B1 | * | 1/2001 | Detampel, Jr. et al. ..... | 379/205 |

* cited by examiner

*Primary Examiner*—Kwang Bin Yao
*Assistant Examiner*—Prenell Jones
(74) *Attorney, Agent, or Firm*—Ryan, Mason & Lewis, LLP

(57) ABSTRACT

A bridging system comprises a router and a number of multipoint servers. For each user requesting to join a particular conference, the router routes the call to a particular server and, if necessary, causes additional servers to be added to increase the capacity for that conference. For example, upon receipt of a user request to join a conference associated with server A, the router first interrogates server A as to current spare capacity. If server A has additional capacity, the router routes the user to server A. However, if server A can not accommodate the user, the router causes server A to invite an additional server—server B—to join the conference. After server B joins the conference, the router routes the user to server B.

35 Claims, 7 Drawing Sheets connection router

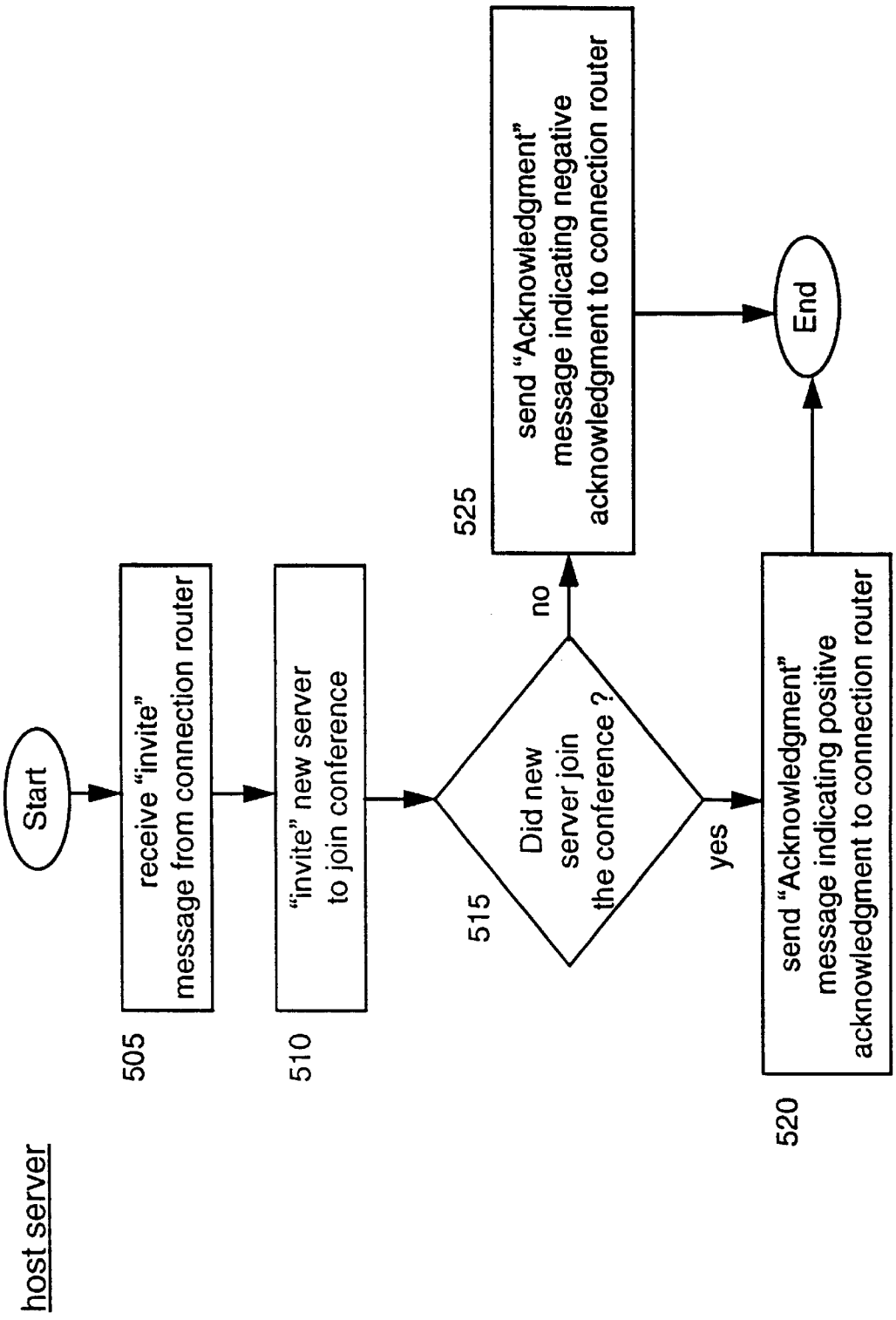

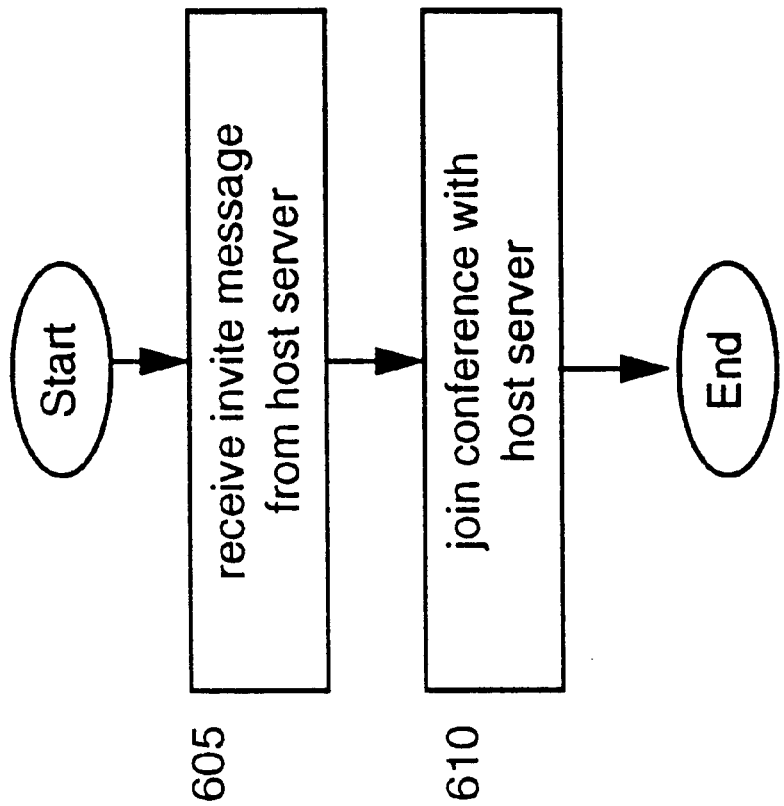

DYNAMICALLY SCALEABLE CONFERENCE SYSTEM

FIELD OF THE INVENTION

This invention relates generally to communications and, more particularly, to multipoint bridging, or conferencing, systems.

BACKGROUND OF THE INVENTION

Generally speaking, multipoint conferencing can take a variety of forms over different types of networks such as packet networks, switched telephone networks, etc. For example, there is multipoint data conferencing in which users can confer about documents and share data In support of multipoint data conferencing, International Telecommunications Union (ITU) standard T.120 defines an umbrella set of protocols over, e.g., packet-based networks. In comparison, there is also multimedia conferencing in which users can participate in audiovisual meetings using, e.g., NetMeeting, which is available from Microsoft®. Like ITU T.120, multimedia conferencing is specified in ITU H.323, which is another umbrella set of protocols covering transmission control protocol/Internet protocol (TCP/IP) connections over packet-based networks.

Multipoint bridging typically involves use of equipment from a bridging service provider for connecting the users (conferees) together. This equipment is typically referred to as a bridge or a multipoint control unit (MCU) that supports the necessary standards, e.g., ITU H.323 for multimedia. Equipment of this nature is referred to herein as a "multipoint server." (It is assumed for simplicity that the multipoint server supports industry standards for inter-operability with other equipment notwithstanding that the equipment may also support company-specific proprietary signaling.)

A multipoint server can be modeled as having a server capacity, N, which is the total number of conferees (users), that the server can, or should, support at any time. This capacity can be related to any one or more of a number of server characteristics. For example, the server capacity could be related to something as simple as the total number of server ports. In this case the server capacity is fixed, i.e., the server can support no more than N users. As another example, the server capacity could be related to a particular "quality of service" (QoS) such as response time. Here, the server can support up to N users and guarantee a maximum response time. In this context, the server does not guarantee the committed QoS if more than N users access the server. In other words, once the a priori defined capacity is reached for a multipoint server, subsequent requests from additional users to join the conference(s) on that server are either approved—thus probably causing performance degradation for all the users—or are blocked.

As such, as conference (traffic) demands increase (especially during peak load times) it may be desirable (if not necessary) to increase the capacity of an existing multipoint server. One alternative is simply to replace this server with a bigger, i.e., more powerful—and costly—server. However, if the traffic is predictable, another alternative is to a priori cascade servers together to support a larger capacity. An illustration of a cascaded bridging configuration is shown in FIG. 1.

In this cascaded bridging configuration, the total needed capacity is a priori divided between a number of servers, 10-1 through 10-n, which each support a plurality of users. This cascaded bridging configuration, or bridge tree, is designed such that users on the same server primarily communicate with each other. For those situations where a user on one server, e.g., multipoint server 10-1, needs to communicate with a user on another server, e.g., multipoint server 10-n, communication is provided via multipoint server 20.

SUMMARY OF THE INVENTION

In contrast to the above-described approach for a priori designed cascaded bridging configurations, we have designed a system for dynamically cascading together a number of multipoint servers in order to increase system capacity.

In an embodiment, a bridging system comprises a router and a number of multipoint servers. For each user requesting to join a particular conference, the router routes the call to a particular server and, if necessary, causes additional servers to be added to increase the capacity for that conference. For example, upon receipt of a user request to join a conference associated with server A, the router first interrogates server A as to current spare capacity. If server A has additional capacity, the router routes the user to server A. However, if server A can not accommodate the user, the router causes server A to invite an additional server—server B—to join the conference. After server B joins the conference, the router routes the user to server B.

BRIEF DESCRIPTION OF THE DRAWING

FIGS. 4–7 show flow charts for use in the system of FIG. 2 in accordance with the principles of the invention.

DETAILED DESCRIPTION

Figure 1:
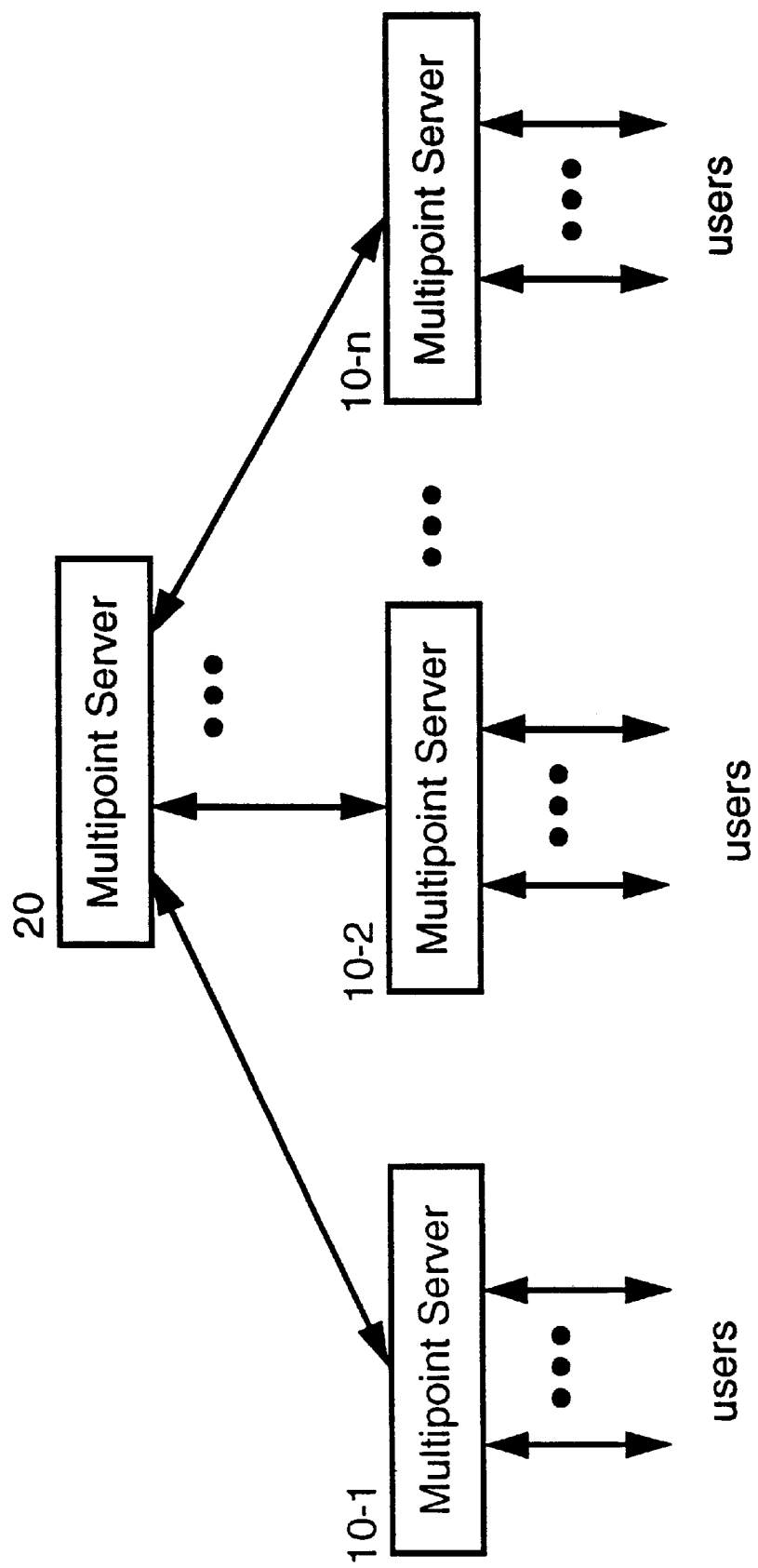
FIG. 1 shows a prior art predefined cascaded bridging configuration.
Figure 2:
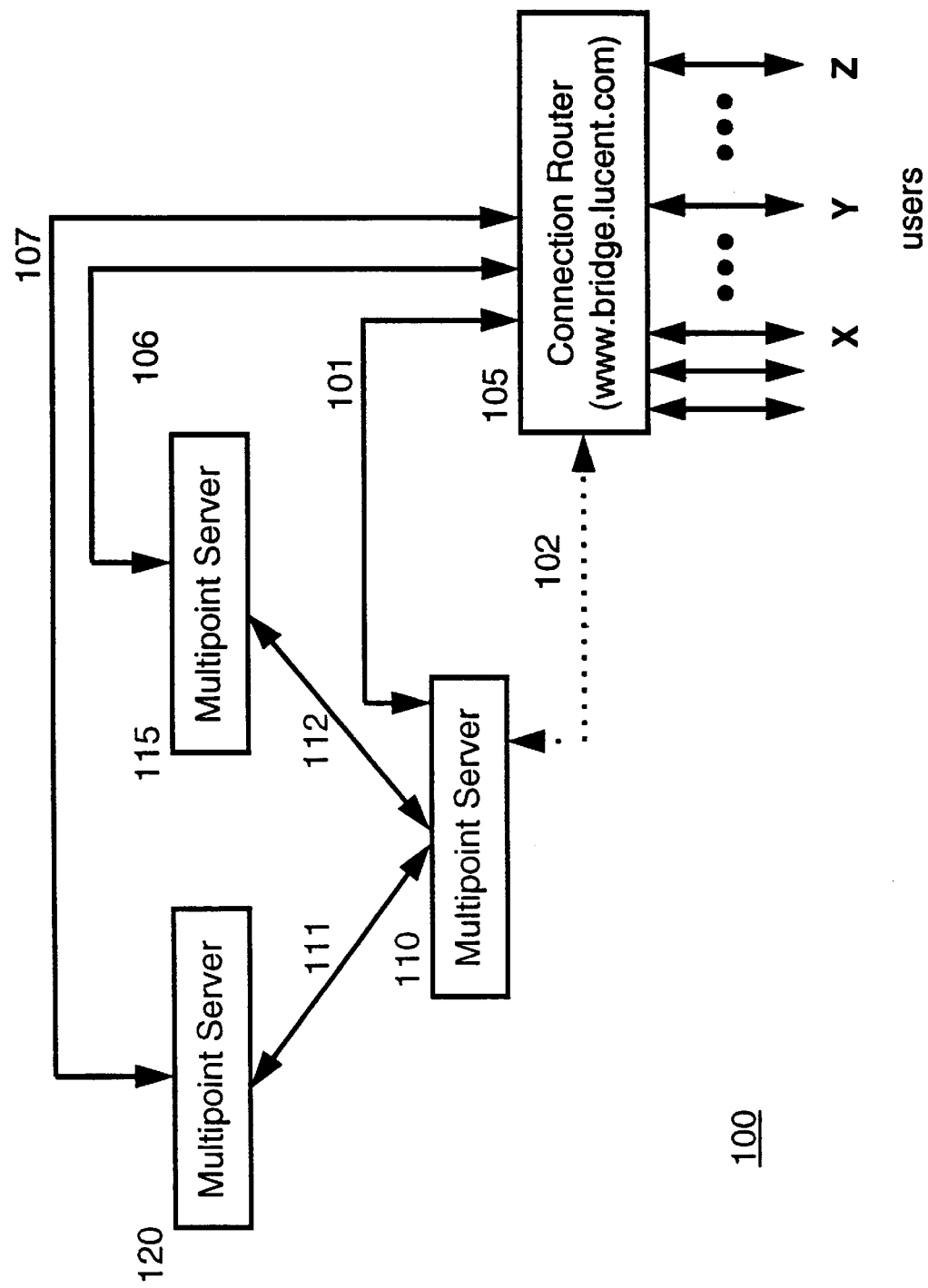
FIG. 2 shows an illustrative embodiment of a bridging system in accordance with the principles of the invention.

An illustrative embodiment of the invention is shown in FIG. 2. Other than the inventive concept, the components of FIG. 2 are well-known and will not be described in detail For example, although shown as a single block element, each multipoint server is an MCU and includes stored-program-control processors, memory, and appropriate interface cards. Similarly, other than the inventive concept, connection router 105 routes packet-based traffic as known in the art. For the purposes of this description, it is assumed that bridging system 100 supports both TCP/IP packet-based traffic and ITU H.323 (described above) for providing audiovisual conferencing capability between the users that access this system. (The configuration of the user endpoints, which are not shown, are not relevant to the inventive concept. In the context of this description, each user endpoint is presumed to be running a NetMeeting type application.) Also, for the purposes of this description, the inventive concept will be described in the context of joining a particular conference involving all three multipoint servers. However, it should be realized that the inventive concept of dynamically adding conference resources is also applicable to the situation where more than one conference is supported by bridging system 100. In addition, those in the art will realize that although the inventive concept is described in the context of a packet-based network, the inventive concept is applicable to other types of networks as well.

As shown in FIG. 2, bridging system 100 comprises a two or more multipoint servers as represented by multipoint servers 110, 115, and 120 (which can be geographically separate from each other). In addition, bridging system 100 comprises connection router 105. As shown, the latter receives connection requests from a plurality of users. It is assumed that these connection requests are conveyed via one or more facilities (not shown) that support TCP/IP packet-based traffic. Connection router 105 is also coupled to each of the multipoint servers 110, 115, and 120 via signaling paths 101, 102, 106 and 107. Again, although shown as separate signaling paths, it is presumed that these signaling paths are established using facilities that support TCP/IP packet-based traffic and represent Internet connections. For example, multiple TCP/IP connections, 101 and 102, can be established between connection router 105 and multipoint server 110 over the same physical facility. Similarly, multipoint server 110 is coupled via signaling paths 111 and 112 to multipoint servers 120 and 115, respectively. (The solid lines of paths 101, 106, 107, 111, and 112, illustratively represent signaling that includes ITU H.323. The dotted line 102 represents a private channel (described below).)

Figure 3:
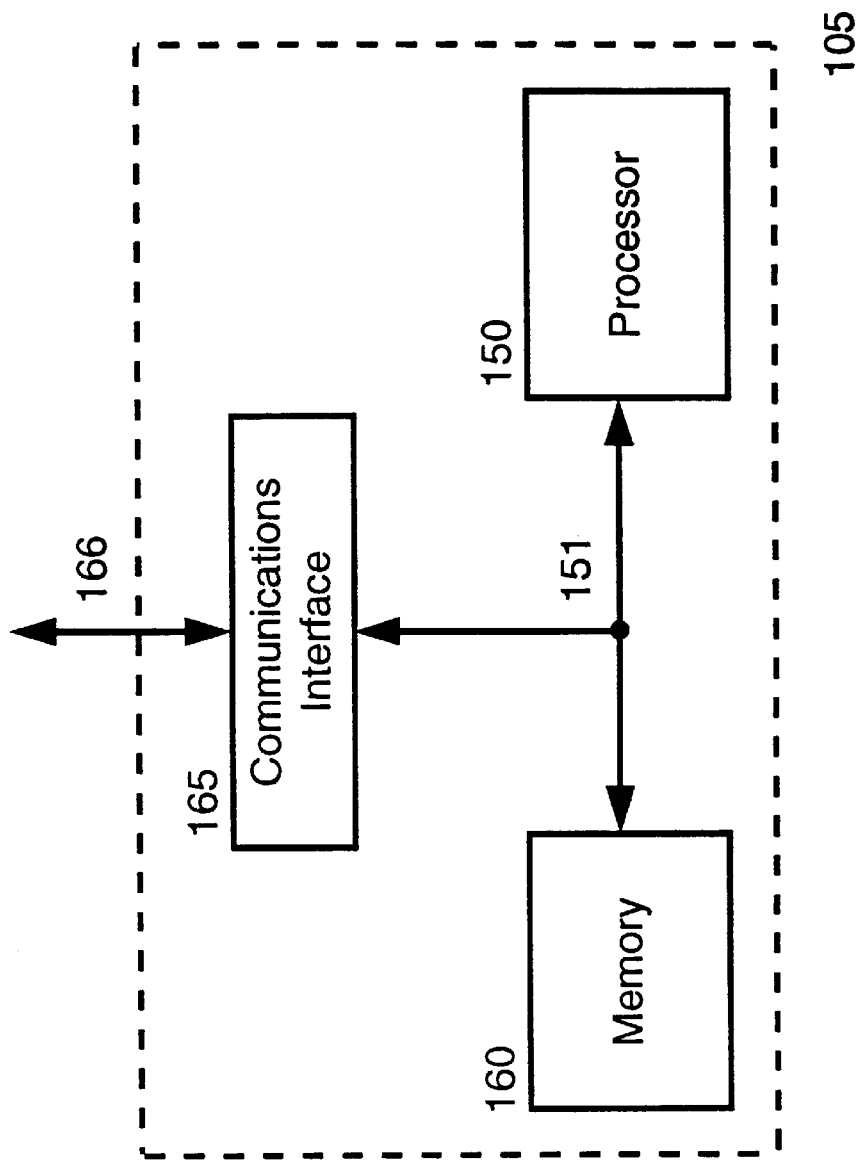
FIG. 3 shows a high level block diagram of connection router 105 of FIG. 2.

In this embodiment of the inventive concept, connection router 105 serves as a central distribution point. In this context, connection router 105 (as described further below) dynamically routes traffic as a function of available system resources. (As will be apparent from the description below, this operation is transparent to other endpoints, e.g., the end user.) Turning briefly to FIG. 3, connection router 105 is a store-program-control based processor architecture and includes processor 150, memory 160 (for storing program instructions and data) and communications interface 165 for coupling to one or more communication facilities as represented by path 166.

Turning back to FIG. 2, it is assumed that a single IP address is associated with connection router 105. As shown, this IP address is represented by the "HyperText Transport Protocol" (http) address "www.bridge.lucent.com." In accordance with the inventive concept, connection router 105 directs new endpoint connections to a particular bridge, or multipoint server, as a function of the available system resources. Illustratively, these resources can be CPU usage, connection loading, bridge availability and/or particular distribution algorithms. For this description, the available capacity for each multipoint server will be used as the illustrative resource upon which connection router 105 will perform routing decisions.

Figure 4:
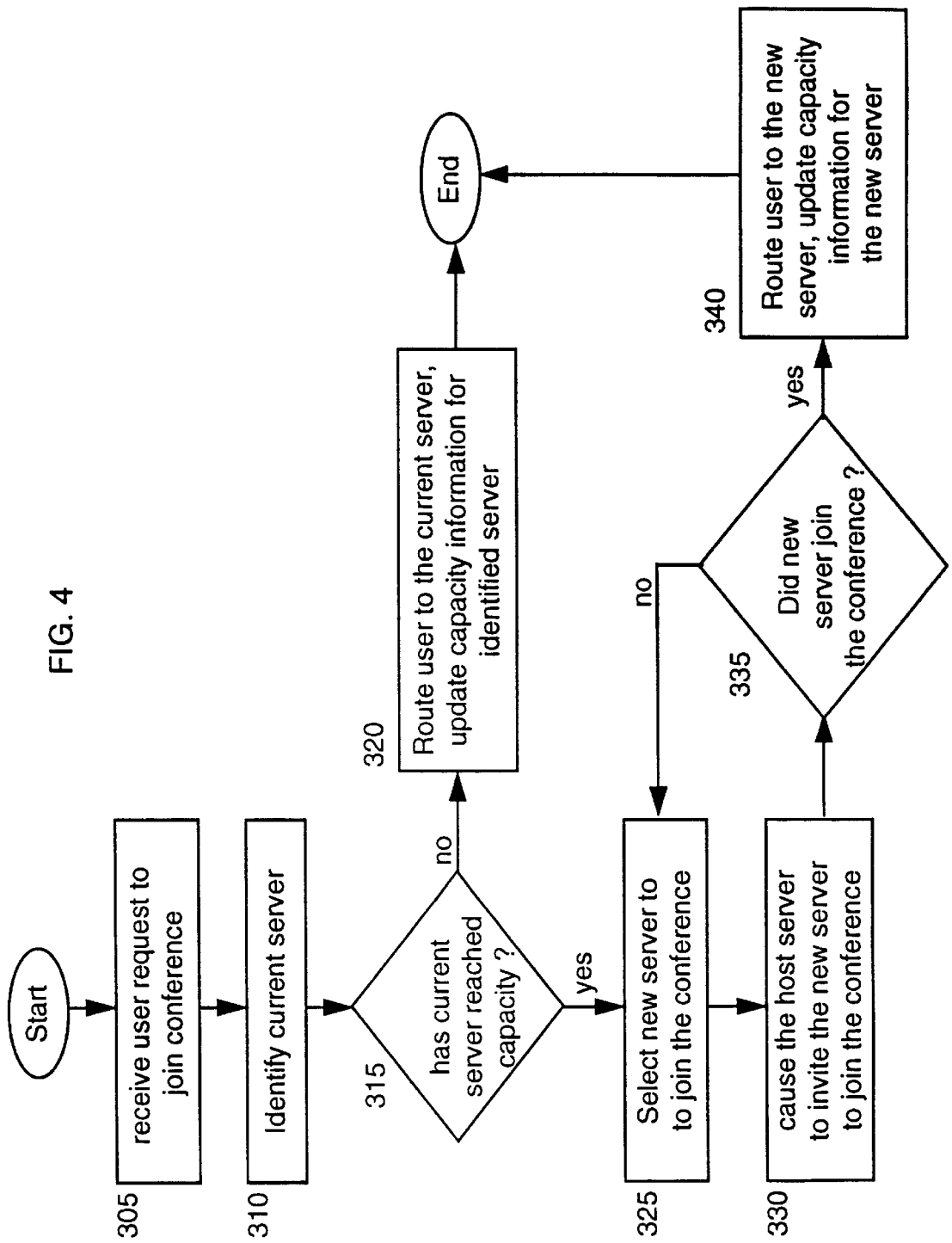

Reference should also be made to FIG. 4, which shows an illustrative flow chart of a method for use in the system of FIG. 2. It is presumed that router 105 and the respective multipoint servers are suitably programmed to carry out the below-described method using conventional programming techniques, which, as such, will not be described herein. For the purposes of this description, it is assumed that a conference is initially established and is in progress on multipoint server 110 and that the bridge tree comprises only multipoint server 110. This first server of the conference is referred to as the "host server" and also as the "current server," both of which are stored as variables by connection router 105 in, e.g., memory 160 of FIG. 3. Also, for the purposes of this description, it is assumed that router 105 maintains a table (e.g., also stored in memory 160 of FIG. 3) of server information. An illustrative table is shown below.

TABLE ONE

| Server | Address | Capacity | Available Capacity |
|---|---|---|---|
| Server 110 | 105.444.320 | 100 | 0 |
| Server 115 | 105.444.321 | 100 | 100 |
| . | . | . | . |
| . | . | . | . |
| . | . | . | . |
| Server 120 | 105.444.3nn | 100 | 100 |

Table One comprises a list of servers and their respective addresses, along with their respective total and available capacities. (Although not shown, additional information can also be stored in Table One such as identifying the conference(s) currently supported by that server, i.e., the conference name or conference identification (ID).) For simplicity, it is assumed that the values in Table One table are administered a prior, e.g., by a system administrator (not shown), although this need not be the case.

In step 305, of FIG. 4, connection router 105 receives a request from user X to join the conference. (As noted above, connection router 105 receives user requests conforming to one of the above-mentioned standards, e.g., ITU H.323. As part of submitting this request, it is assumed that the user a priori knows the http address of connection router 105. Also, as noted above, the invention is illustrated in the context of one conference. However, the connection router 105 would also receive a conference ID that identifies the conference the user wishes to join.) In step 310, connection router 105 identifies the current server using the above-mentioned variable. As noted above, at this point the current server is multipoint server 110. In step 315, connection router 105 determines if the current server has already reached its capacity. If the current server has not reached its capacity, connection router 105 routes the user to the current server, via signaling path 101, and updates the available capacity information in Table One, e.g., by reducing the value by one, in step 320. However, as can be observed from Table One, the available capacity for multipoint server 110 is zero. As such, connection router 105 selects a new server to join the conference in step 325. In this example, connection router 105 simply continues down to the next row entry in Table One. (It should be noted that other selection techniques could be used, e.g., using geographical information associated with the user's IP address to select a new server in physical proximity to the user. This may entail storing additional information, e.g., associating subnet addresses of the user to areas of the country, along with the geographical locations of each server, or, requiring the user to submit such information in the request to join the conference.)

In step 325, connection router 105 selects server 115 as a new server to join to the conference. (Although not shown, connection router 105 could also perform an additional check at this point for the available capacity of the new server). In step 330, connection router 105 causes the host server (here multipoint server 110) to request the new server to join the conference (described further below) via signaling path 102. In step 335, connection router 105 determines if the new server has joined the conference (also described below). If the new server has not joined the conference, connection router 105 returns to step 325 and selects the next server in the table as the new server. (Should all the servers be unavailable, connection router 105 blocks the user from joining the conference and an appropriate error message is transmitted to the user in accordance with ITU H.323.) However, if the new server has joined the conference, in step 340 connection router 105 associates the new server as the current server, updates the available capacity information for the newly added server, e.g., by reducing that respective value by one, and routes the user to the new server. In this example, multipoint server 115 is added to the bridge tree (heretofore only comprising multipoint server 110) via signaling path 112 and user X is routed to multipoint server 115 via Internet path 106. Thus, and in accordance with the inventive concept, the conference capacity was dynamically increased by the addition of multipoint server 115 to the conference hosted by multipoint server 110.

Figure 5:
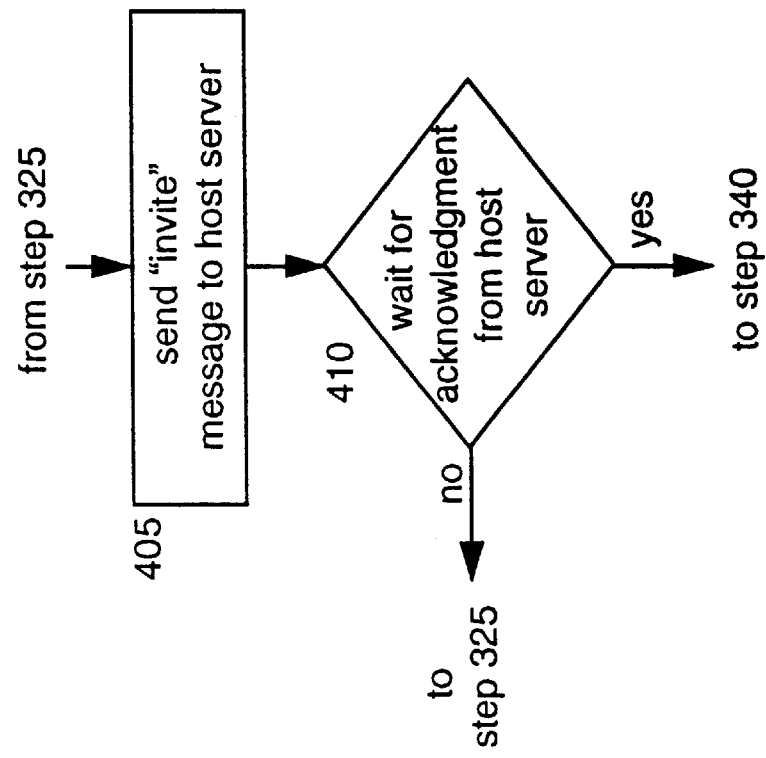

Reference should now also be made to FIGS. 5, 6, and 7, which show illustrative flow charts of methods for use in connection router 105, the host server, and the new server. The flow chart of FIG. 5 shows illustrative steps for use in connection router 105 for performing steps 330 and 335 of FIG. 4. Similarly, FIGS. 6 and 7 show complementary steps in the host server and the new server, respectively. In this example, it is assumed that connection router 105 and the host server (here, represented by multipoint server 110) communicate using a private channel via the Internet. This private channel, or proprietary signaling (PS) scheme, is represented by signaling path 102 of FIG. 2. To implement this proprietary signaling, the connection router and the host server can use any one of a number of different protocols, e.g., sockets, Microsoft's Distributed Component Object Model (DCOM), Common Object Request Broker Architecture (CORBA), etc. In the context of this example, it is assumed that DCOM is used to implement the private channel. Other than the inventive concept, the use of DCOM to support communication among objects on different computers is known in the art. DCOM's preferred transport protocol is the connectionless user datagram protocol (UDP) subset of the TCP/IP protocol suite. (As such, even though shown as a separate signaling path on FIG. 2, this private-channel can be transported via the Internet on the same physical channel as the user traffic.) Information on DCOM can be found on the Internet by accessing Microsoft's web page at "http://www.microsoft.com." Additional Information can also be found at: "http://ds1.internic.netlinternet-drafts/draft-brown-dcom-v1-spec-00.txt."

Turning first to FIG. 5, in step 405, connection router 105 sends a predefined PS "invite" message to the host server in accordance with the principles of the invention via signaling path 102. The PS "invite" message includes at least three predefined data fields. One field indicates to the host server the type of PS message (in this instance an "invite" message), another data field includes the Internet address of the new server (taken from Table One, above), and the third data field represents a conference identifier, or conference name. Thus, connection router 105 causes the host server to invite the new server to join the identified conference. In step 410, connection router 105 waits for a PS acknowledgment message from the host server. (Like the "invite" message above, the acknowledgment message includes at least one predefined data field indicating either a positive acknowledgment, i.e., the new server has joined the conference, or a negative acknowledgment, indicating that the new server has not joined the conference.) If a positive acknowledgment message is received, connection router 105 proceeds to step 340. On the other hand if a negative acknowledgment message is receiver, connection router 105 proceeds to step 325. (It should be noted that connection router 105 also "times-out" if an acknowledgment message is not received in a predefined period of time.)

Turning now to FIGS. 6 and 7, complementary steps in the host server and the new server are shown. In FIG. 6, in step 505, the host server receives the PS "invite" message from connection router 105. In step 510, the host server "invites" the server (designated by the IP address within the PS "invite" message) in accordance with, e.g., ITU H.323 via, e.g., signaling path 112. In other words, the new server looks like a conference endpoint to the host server. In step 515, the host server determines if the new server has accepted the invitation in accordance with ITU H.323. If the new server has accepted the invitation, the host server sends a predefined PS "acknowledgment" messaging indicating a positive acknowledgment in step 520. However, if the new server declines the invitation (or a suitably defined time-out occurs), the host server sends a predefined PS "acknowledgment" messaging indicating a negative acknowledgment in step 525. In FIG. 7, the new server receives the invite message from the host server, in step 605, and joins the conference in step 610 in accordance with ITU H.323 via, e.g., signaling path 112. (It is assumed that the new server defaults to joining the conference.)

As additional users join the conference, eventually the capacity on multipoint server 115 will be reached. For example, assume that when user Y, of FIG. 2, requests to join the conference there is no available capacity on multipoint server 115. At this point, and in accordance with the flow charts of FIGS. 4–7, connection router 105 dynamically attaches multipoint server 120 to the bridge tree represented by multipoint servers 110 and 115. (Multipoint server 120 is coupled to the bridge tree via signaling path 111). Similarly, as more users join the conference, connection router 105 can add an additional multipoint server to the bridge tree when, e.g., user Z requests to join the conference but multipoint server 120 is at capacity.

As can be observed from above, the inventive concept provides a way of dynamically distributing the load, due to a large number of participants, to multiple data conferencing bridges so that the throughput is maintained without affecting the performance of the conferencing applications of the end user participants. Thus, the inventive concept provides a scaleable solution for expanding bridge capacity. Indeed, the dynamic cascading of multipoint servers provides the illusion of a single bridge of almost unlimited capacity.

As described above, the connection router (or other equivalent equipment) dynamically attaches multipoint servers as a function of system resource measurement. In this example, the system resource measurement was illustratively represented by the server capacity values entered into a table. It should be noted that each multipoint server may be serving other conferences that the connection router is unaware of. As such, other forms of resource measurement could be used. For example, the connection router could query each current server with respect to actual, e.g., CPU, load in the multipoint server using the above-mentioned PS. If enough CPU capacity is available the user could be routed to the current server or alternatively a new multipoint server could be attached to the bridge. (In this variation, the current server itself could evaluate its own CPU load and indicate its acceptance in a responsive PS message, or the current server could simply report back current CPU load and the connection router, via comparison to a predefined value, could decide if the current server should continue to be used or if a new multipoint server should be dynamically added to the bridge tree.

As noted above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was described in the context of a connection router, one of the multipoint servers could also function as a central distribution point for dynamically adding conference resources. Similarly, although described in the context of ITU H.323, the inventive concept is applicable to other multipoint conferencing systems such as those defined by ITU T.120. In addition, even though the private channel for communicating control information was illustratively implemented using TCP/IP-based DCOM, other forms of private channels could also be used, e.g., direct circuit-switched connections, private lines, etc.

What is claimed:

1. A method for use in a multipoint bridging system, the method comprising the steps of:
   using at least one multipoint server for conferencing a number of users together;
   receiving a request to add an additional user to the conference;
   identifying a current multipoint server from one of the multipoint servers conferencing the users together;
   determining if the current multipoint server has spare capacity to support the additional user;
   if there is no spare capacity, dynamically adding an additional multipoint server to the conference and routing the additional user to the additional multipoint server, the step of dynamically adding an additional multipoint server including the steps of:
   selecting a new server to join the conference; and
   causing one of the multipoint servers conferencing the users together to invite the new server to join the conference, whereby the new server becomes the additional multipoint server; and
   if there is spare capacity, routing the additional user to the current multipoint server.

2. The method of claim 1 wherein the dynamically adding step is performed as a function of available resources of the multipoint bridging system.

3. The method of claim 2 wherein the dynamically adding step is performed as a function of spare capacity of the multipoint bridging system.

4. The method of claim 3 wherein the dynamically adding step queries a storage element used for storing spare capacity information for the multipoint bridging system.

5. The method of claim 3 wherein the dynamically adding step queries at least one of the multipoint servers as to its spare capacity.

6. The method of claim 1 wherein the determining step includes the step of retrieving spare capacity information associated with the multipoint servers from a storage element.

7. The method of claim 1 further comprising the step of repeating the selecting step and the causing step if the invited new server does not join the conference.

8. The method of claim 1 wherein the causing step includes the step of communicating with the multipoint server via a private communications channel.

9. The method of claim 8 wherein the private communications channel uses proprietary signaling.

10. An improved method for use in a router of a multipoint bridging system, the multipoint bridging system further comprising a bridge tree comprising at least one multipoint server supporting an existing conference, the method comprising the steps of:
    receiving a request to add an additional user to the conference;
    determining if the bridge tree has available resources to support the additional user;
    if there are no available resources, dynamically adding an additional multipoint server to the bridge tree; and
    routing the additional user to one of the multipoint servers.

11. The method of claim 10 wherein the determining step is performed as a function of spare capacity of the bridge tree.

12. The method of claim 11 wherein the determining step includes the step of querying a storage element used for storing spare capacity information for the bridge tree.

13. The method of claim 10 wherein the determining step includes the step of querying at least one of the multipoint servers of the bridge tree as to its available resource.

14. The method of claim 13 wherein the available resource of the multipoint server is its spare capacity.

15. The method of claim 10 wherein the adding an additional multipoint server step includes the steps of:
    selecting a new server to join the bridge tree; and
    causing one of the multipoint servers conferencing the users together to invite the new server to join the bridge tree whereby the new server becomes the additional multipoint server.

16. Apparatus for use in providing multipoint conferencing, the apparatus comprising:
    a bridge tree comprising at least one multipoint server supporting an existing conference; and
    a router for routing users to the existing conference and for causing additional multipoint servers to be dynamically added to the bridge tree of the existing conference to support some of the users.

17. The apparatus of claim 16 wherein the router causes additional multipoint servers to be added as a function of available resources of the bridge tree.

18. The apparatus of claim 17 wherein the router causes additional multipoint servers to be added as a function of spare capacity of the bridge tree.

19. The apparatus of claim 18 wherein the router includes a storage element for storing spare capacity information of the bridge tree.

20. The apparatus of claim 18 wherein the router queries at least one of the multipoint servers of the bridge tree as to its spare capacity.

21. The apparatus of claim 18 wherein the router communicates to multipoint servers of the bridge tree via a private communications channel.

22. The apparatus of claim 21 wherein the private communications channel uses proprietary signaling.

23. The apparatus of claim 16 wherein the router causes additional multipoint servers to be added to the conference by (a) selecting a new server to join the conference; and (b) causing one of the multipoint servers of the bridge tree to invite the new server to join the conference whereby the new server becomes the additional multipoint server.

24. Apparatus for use in providing multipoint conferencing, the apparatus comprising:
    an existing bridge tree comprising at least one multipoint server for supporting an existing conference; and
    a processor for dynamically adding additional multipoint servers to the existing bridge tree if necessary to support additional users.

25. The apparatus of claim 24 wherein the processor (a) determines if the multipoint servers of the existing bridge tree have spare resources to support the additional users, and (b) if there is no spare resources, adds an additional multipoint server to the bridge tree.

26. The apparatus of claim 24 wherein the processor causes additional multipoint servers to be added as a function of available resources of the bridge tree.

27. The apparatus of claim 24 wherein the processor causes additional multipoint servers to be added as a function of spare capacity of the bridge tree.

28. The apparatus of claim 27 wherein the processor includes a storage element for storing spare capacity information of the bridge tree.

29. The apparatus of claim 27 wherein the processor queries at least one of the multipoint servers of the bridge tree as to its spare capacity.

30. The apparatus of claim 29 wherein the processor communicates to multipoint servers of the bridge tree via a proprietary signaling channel.

31. The apparatus of claim 24 wherein the processor adds multipoint servers to the conference by (a) selecting a new server to join the conference; and (b) causing one of the multipoint servers of the existing bridge tree to invite the new server to join the conference whereby the new server becomes the additional multipoint server.

32. The apparatus of claim 24 wherein the processor is a router.

33. The method of claim 10, further comprising the step of:

configuring at least one of the multipoint servers to function as a central distribution point for dynamically adding conference resources.

34. The apparatus of claim 16, wherein at least one of the multipoint servers is configured to function as a central distribution point for dynamically adding conference resources.

35. The apparatus of claim 24, wherein at least one of the multipoint servers is configured to function as a central distribution point for dynamically adding conference resources.

* * * * *